US007457670B2

(12) United States Patent
Hunt et al.

(10) Patent No.: US 7,457,670 B2
(45) Date of Patent: Nov. 25, 2008

(54) GOBO VIRTUAL MACHINE

(75) Inventors: Mark A. Hunt, Derby (GB); Drew Findley, Sherman Oaks, CA (US)

(73) Assignee: Production Resource Group, LLC, New Windsor, NY (US)

( * ) Notice: Subject to any disclaimer, the term of this patent is extended or adjusted under 35 U.S.C. 154(b) by 812 days.

(21) Appl. No.: 10/913,023

(22) Filed: Aug. 6, 2004

(65) Prior Publication Data

US 2005/0083487 A1 Apr. 21, 2005

Related U.S. Application Data

(60) Provisional application No. 60/493,531, filed on Aug. 7, 2003.

(51) Int. Cl.

*G05B 15/00* (2006.01)
*G05B 19/18* (2006.01)
*G06K 9/32* (2006.01)
*G02B 26/00* (2006.01)
*G02B 26/08* (2006.01)

(52) U.S. Cl. .............................. 700/1; 700/2; 382/295; 359/291; 359/298

(58) Field of Classification Search ..................... 700/1, 700/2; 382/295; 359/291, 298

See application file for complete search history.

(56) References Cited

U.S. PATENT DOCUMENTS

| | | | | |
|---|---|---|---|---|
| 5,414,328 | A | 5/1995 | Hunt et al. | |
| 5,812,596 | A | 9/1998 | Hunt et al. | |
| 5,969,485 | A | 10/1999 | Hunt | |
| 5,983,280 | A | 11/1999 | Hunt | |
| 6,029,122 | A | 2/2000 | Hunt | |
| 6,175,771 | B1 | 1/2001 | Hunt et al. | |
| 6,549,326 | B2 | 4/2003 | Hunt et al. | |
| 6,565,941 | B1 | 5/2003 | Hewlett | |
| 6,751,239 | B2 * | 6/2004 | Raman et al. | 370/466 |

(Continued)

OTHER PUBLICATIONS

Carr-J., "Lighting Up Storage" 2004 Network Magazine p. 72-74.*

(Continued)

*Primary Examiner*—Albert DeCady
*Assistant Examiner*—Thomas H Stevens
(74) *Attorney, Agent, or Firm*—Law Office SC Harris

(57) ABSTRACT

Producing complicated effects based on image processing operations. The image processing operations are defined for a processor which may be different than the processor which is actually used. The processor that is actually used runs an interpreter that interprets the information into its own language, and then runs the image processing. The actual information is formed according to a plurality of layers which are combined in some way so that each layer can effect the layers below it. For example, the layers may add to, subtract from, or form transparency to the layer below it or make color filtering the layer below it. This enables many different effects computed and precompiled for a hypothetical processor, and a different processor can be used to combine and render those effects.

31 Claims, 4 Drawing Sheets

U.S. PATENT DOCUMENTS

| | | | |
|---|---|---|---|
| 2005/0057543 | A1 | 3/2005 | Hunt et al. |
| 2005/0086589 | A1 | 4/2005 | Hunt |
| 2005/0094635 | A1 | 5/2005 | Hunt |
| 2005/0190985 | A1 | 9/2005 | Hunt |
| 2005/0200318 | A1 | 9/2005 | Hunt et al. |
| 2006/0158461 | A1 | 7/2006 | Reese et al. |
| 2006/0187532 | A1 | 8/2006 | Hewlett et al. |
| 2006/0227297 | A1 | 10/2006 | Hunt |

OTHER PUBLICATIONS

Tobin et al., "Accommodating Multiple Illumination Sources in a Imaging Colorimetry Environment" 2000 The International Society for Optical Engineering, p. 194-204.*

Schumacher et al., "4! (Apple Macintosh G4)" Jan. 2003 EMedia Magazine p. 36-40.*

* cited by examiner

GOBO VIRTUAL MACHINE

CROSS-REFERENCE TO RELATED APPLICATION

This application claims the benefit of prior U.S. Provisional Application Ser. No. 60/493,531, filed Aug. 7, 2003 and entitled “Gobo Virtual Machine.”

BACKGROUND

Stage lighting effects have become increasingly complex, and are increasingly handled using more and more computing power. During a show, commands for various lights are often produced by a console which controls the overall show. The console has a number of encoders and controls which may be used to control any number of lights.

Complex effects may be controlled by the console. Typically each effect is individual for each light that is controlled.

SUMMARY

The present system teaches an apparatus in which a computer produces an output which is adapted for driving a projector according to commands produced by a console that controls multiple lights. The projector produces the light according to the commands entered on the console.

According to an aspect, certain commands are in a special generic form which enables them to be processed by many different computers.

BRIEF DESCRIPTION OF THE DRAWINGS

These and other aspects will now be described in detail with reference to the accompanying drawings, wherein.

DETAILED DESCRIPTION

Figure 1:
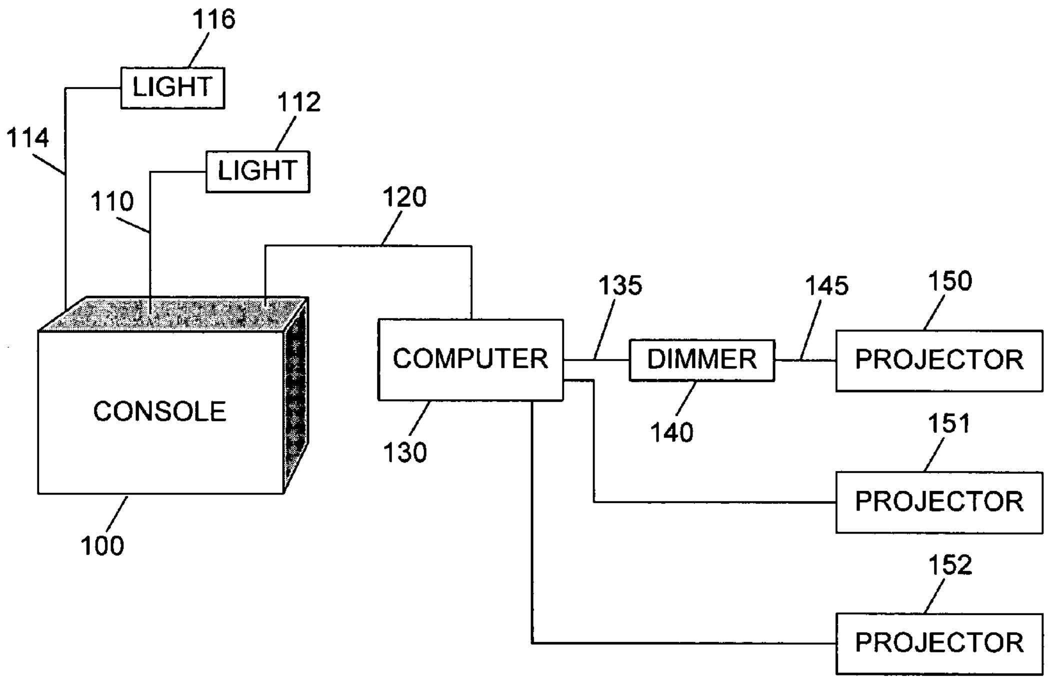
FIG. 1 shows a block diagram of the overall system.

The output of the console 100 may be in various different formats, including DMX 512, or ethernet. The console 100 may be an ICON (TM) console. This console produces a number of outputs 110, 114 to respectively control a number of lighting units 112, 116. Console is shown producing output 110 to control light 112. Similarly, output 114 may be produced to control light 116.

Another output 120 may be produced to control a digital light shape altering device. Such a light may be the icon M, aspects of which are described, for example, in U.S. Pat. Nos. 6,549,326, 6,617,792, 6,736,528. In this embodiment, however, the output 120 which is intended for the light is actually sent to a computer 130 which runs software to form an image according to commands from the console. The computer 130 produces an output 135 which may be a standard video output. The video output 135 may be further processed according to a dimmer 140. The output of the dimmer is connected to a projector 150. The projector may be, for example, a projector using digital mirror devices or DMD’s.

The projector produces output according to its conventional way of producing output. However, this is based on the control 120 which is produced by the console.

Figure 2:
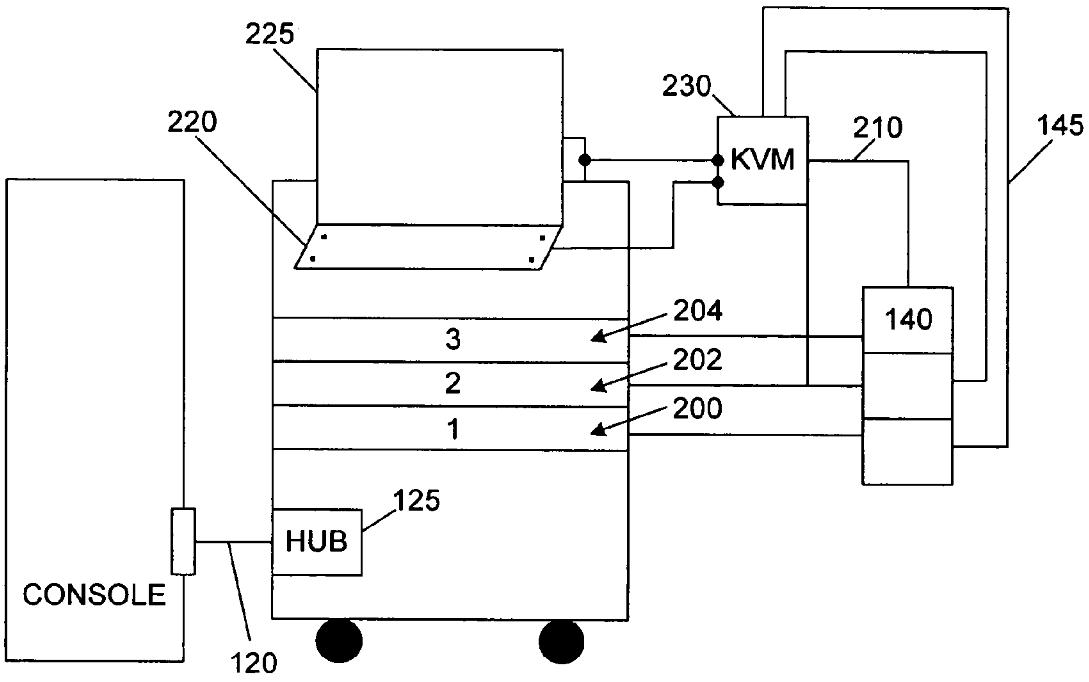
FIG. 2 shows a block diagram of the connection between the console and the box.

In the embodiment, the computer 130 may actually be a bank of multiple computers, which respectively produce multiple outputs for multiple projectors 150, 151, 152. FIG. 2 shows further detail about the connection between the console and the computer. The output of the console may be in any network format. In this embodiment, the output of the console may be in ethernet format, containing information that is directed to three different channels.

The computer 130 is actually a standalone half-height rack, on wheels, with three rack-mounted computers therein. The ethernet output 120 is coupled to an ethernet hub 125 which directs the output to each of the three computers. The three computers are shown as computer 1; designation 200, computer 2; designation 202, and computer 3; designation 204. Each of these computers may be standard computers having keyboard input and display outputs. The outputs of each of the computers are connected to the interface board 140.

Board 140 produces and outputs a first dimmed output 145 adapted for connection to the projector. The second, typically non-dimmed output 210 is connected to a three-way KVM switch. Each of the three computers have outputs which are coupled to the KVM switch. The KVM switch produces a single output representative of the selected computer output.

A single rack-mounted keyboard and monitor are located within the rack and driven by the KVM switch. The keyboard 220 is also connected to the KVM switch 230, and produces its output to the selected computer. For example, when computer 3 is selected, the KVM switch sends the output from keyboard 222 to computer 3 and the output from computer 3 is sent to display 225.

Any type of switch can be used, however standard KVM switches are typically available. Moreover, while this embodiment describes three different computers being used, there is practically no limit on the number of computers that can share input and output with a KVM switch.

The dimmer board may carry out dimming by multiplying each video output by analog values supplied by the associated computer. Moreover, the KVM switch is shown outside of the rack for simplicity, but in reality the KVM switch is rack-mounted within the rack.

As described above, the console produces a signal for each of many lights. That signal represents the desired effect. Different kinds of effects that can be produced may be described herein. The computer which actually does the image processing to form the desired result requested by the console. The computer processes the signal by receiving the command, converting that command into an image which forms a layer, and combining the multiple layers to form an overall image to be displayed by the projector/lamp.

The final image is formed by combining a plurality of layers. Each layer can have a number of different characteristics, but primarily, each layer may be considered to have a shape, a color, and/or an effect. The layers are combined such that each layer covers, adds to, subtracts, or allows transparency, to a layer below it.

Figure 3:
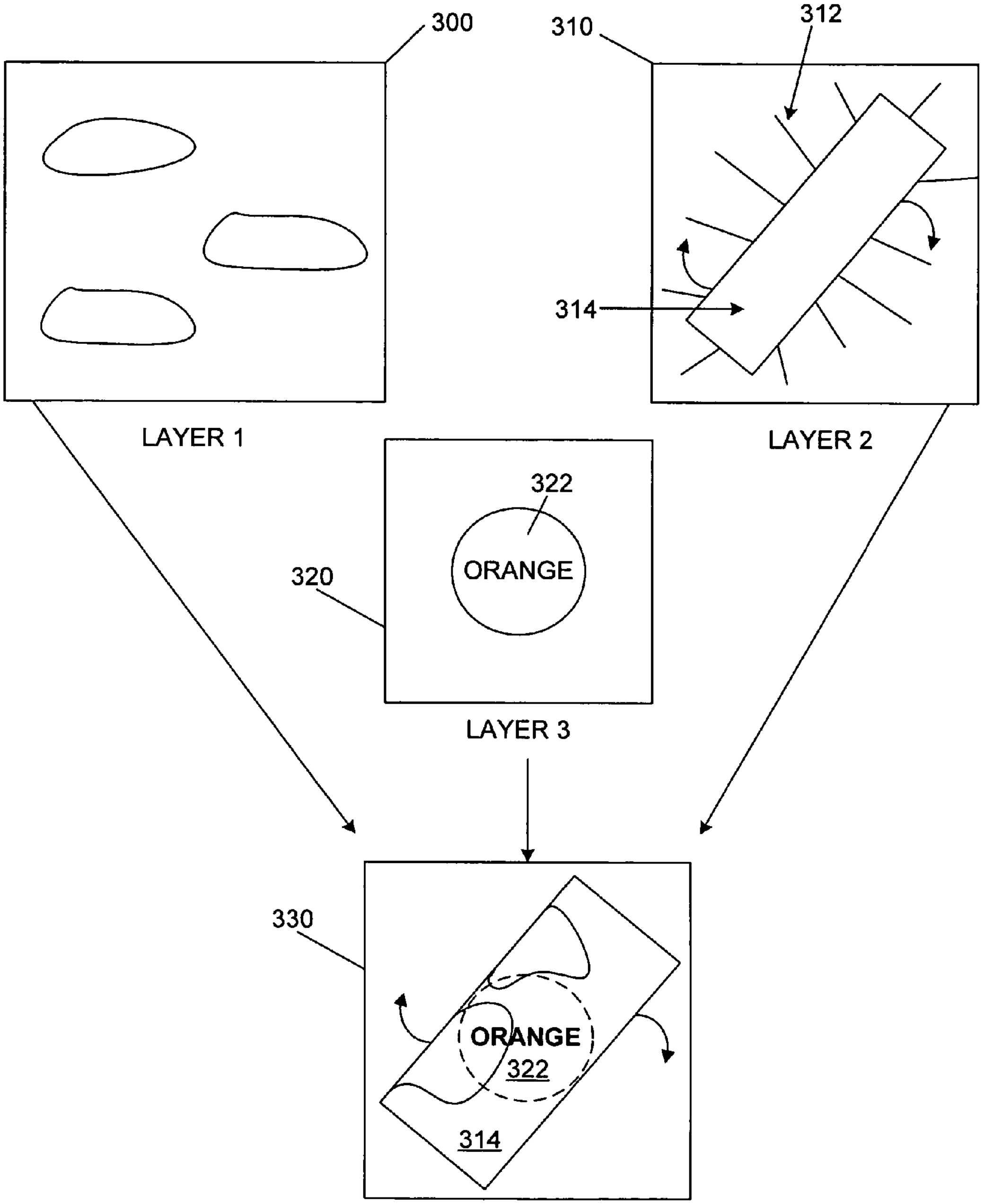
FIG. 3 shows a combination of multiple layers forming a final displayed image.

An example of the operation is shown in FIG. 3. FIG. 3 shows a first layer 300 which is an animation of clouds. The animation is continuous, so that the user sees the effect of traveling through those clouds.

Layer 2 is overlaid on the layer one. Layer 2 is shown as 310, and corresponds to a rectangle which is rotating in a clockwise direction at a specified speed. In this layer, the perimeter area 312 is effectively black and opaque, while the interior area 314 is clear. Accordingly, as this layer is superimposed over the other layer, the area 314 allows the animation of layer 1 to show through, but the area 312 blocks the animation from showing through. The resultant image is shown as 330, with the rotating triangle 314 being transparent and showing portions of the cloud animation 300 through it. A third layer 320 is also shown, which simply includes an orange circle 322 in its center. In the resultant image 330, the orange circle 322 forms an orange filter over the portion of the scene which is showing.

Each layer can have a number of different effects, besides the effects noted above. An incomplete list of effects is:

color shape intensity timing rotation

Parameters associated with any of these effects can be specified. For example, parameters of rotation can be selected including the speed of rotation, the direction of rotation, and the center of rotation. One special effect is obtained by selecting a center of rotation that is actually off axis of the displayed scene. Other effects include scaling Blocking (also called subtractive, allowing defining a hole and seeing through the hole).

Color filtering (changing the color of any layer or any part of any layer).

Decay (which is a trailing effect, in which as an image moves, images produced at previous times are not immediately erased, but rather fade away over time giving a trailing effect).

Timing of decay (effectively the time during which the effect is removed).

A movie can also be produced and operations can include coloring the movie scaling the movie dimming of the image of the movie Shake of the image, in which the image is moved up and down or back-and-forth in a specified shaking motion based on a random number. Since the motion is random, this gives the effect of a noisy shaking operation.

Wobble of the image, which is effectively a sinusoidal motion of the image in a specified direction. For wobble of the image, different parameters can be controlled, including speed of the wobble.

Forced redraw-this is a technique where at specified intervals, a command is given to produce an all-black screen. This forces the processor to redraw the entire image.

Other effects are also possible.

Figure 4:
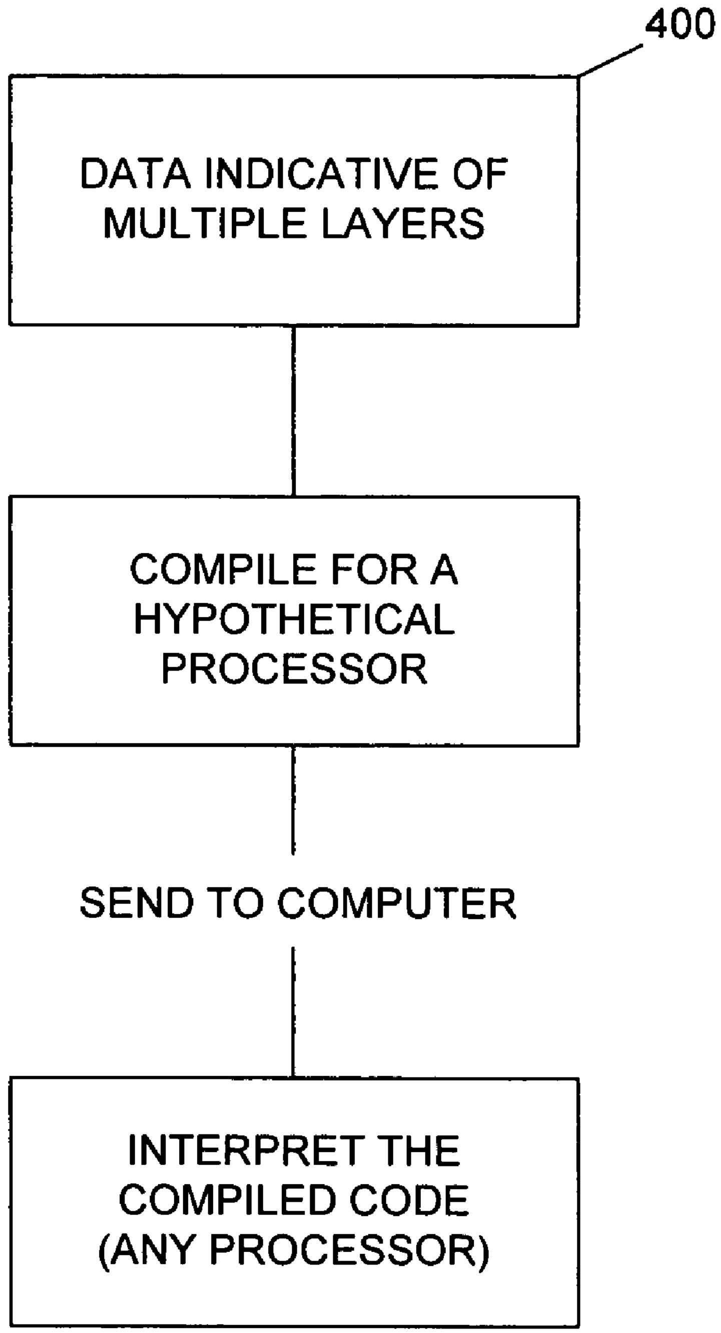
FIG. 4 shows the way that the code can be compiled for a special kind of processor.

The computer may operate according to the flowchart of FIG. 4. The image itself is produced based on information that is received from the console, over the link 120. Each console command is typically made up of a number of layers. At 400, the data indicative of these multiple layers is formed.

Note that this system is extremely complex. This will require the computer to carry out multiple different kinds of highly computation-intensive operations. The operations may include, but are not limited to, playing of an animation, rotating an image, (which may consist of forming the image as a matrix arithmetic version of the image, and rotating the matrix), and other complicated image processes. In addition, however, all processors have different ways of rendering images.

In order to obtain better performance, the code for these systems has been highly individualized to a specified processor. For example, much of this operation was done on Apple processors, and the code was individualized to an Apple G4 processor. This can create difficulties, however, when new generations of processors become available. The developers are then given a choice between creating the code, and buying outdated equipment.

According to this system, the code which forms the layers is compiled for a specified real or hypothetical processor which does all of the operations that are necessary to carry out all of the image processing operations. Each processor, such as the processor 200, effectively runs an interpreter which interprets the compiled code according to a prewritten routine. In an embodiment, a hypothetical processor may be an Apple G4 processor, and all processors are provided with a code decompilation tool which enables operating based on this compiled code. Notably, the processor has access to the open GL drawing environment which enables the processor to produce the image. However, in this way, any processor is capable of executing the code which is produced. This code may be compiled versions of any of the effects noted above.

Although only a few embodiments have been disclosed in detail above, other modifications are possible. All such modifications are intended to be encompassed within the following claims.

What is claimed is:

1. A control system for a console based lighting system, comprising:

a housing, housing a plurality of computers, and having a network connection which receives network commands indicating a plurality of different images to be drawn on a plurality of different projector sources;

a keyboard and monitor, coupled to said housing; each computer of said plurality of computers connected to receive one of said network commands representing one of said images, and to carry out image processing on said network commands, each computer producing a video output representing a video scene formed by each of said network commands, and wherein each of said scenes created by each of said layers, is formed of a plurality of different image layers; and a keyboard/monitor switch, coupled to each of said computers and to said keyboard and monitor, and connected to allow said keyboard and monitor to provide commands to and receive output from any of said plurality of computers; and wherein said computers carry out said image processing using compiled commands, which are compiled in a language that is native to a hypothetical processor, different than a language of a processor in said housing.

2. A system as in claim 1, wherein each of said plurality of computers receives a command on said network connection for an image that is formed of a plurality of different image layers, and forms each of said image layers, and combines said image layers to produce a combined output.

3. A system as in claim 1, wherein each of said layers include at least one of a time, a color, and/or an effect, and each layer can affect any of the other layers.

4. A system as in claim 3, wherein said layer are arranged with one layer overlaying each other layer, each layer affects layers below that layer.

5. A system as in claim 3, wherein each layer can have a parameter associated therewith, specifying an amount of the effect.

6. A system, comprising a first portion, allowing specification of different effects to be used to project light using a projector, where said effects include a plurality of layers, each layer defining a shape defining a perimeter of an output projection and a color; and a processor, operating according to said specification, to produce an output indicative of said effects, by combining said layers to create a composite image, and to produce an output indicative thereof, which output is in a form to drive a projector; and said processor runs an interpreter, and the effects are written in a language for a hypothetical processor other than the native language of said processor.

7. A system as in claim 6, wherein said layers are arranged with one layer overlaying each other layer, and said layers are combined so that each layer covers a layer below it.

8. A system as in claim 6, wherein said layers are arranged with one layer overlaying each other layer, and said layers are combined so that each layer adds to a layer below it.

9. A system as in claim 6, wherein said layers are arranged with one layer overlaying each other layer, and said layers are combined so that each layer subtracts from a layer below it.

10. A system as in claim 6, wherein said layers also define an image effect.

11. A system as in claim 10, wherein said effect includes rotating an entire image around a center of rotation which is outside of a displayed screen.

12. A system as in claim 10, wherein said effect comprises defining a hole, and allowing only parts within that hole to be seen.

13. A system as in claim 10, wherein said effect comprises color filtering which changes a color of any layer or any part of any other layer.

14. A system as in claim 10, wherein said effect comprises defining a time during which the effect is removed, and after which the effect is no longer present.

15. A system as in claim 10, wherein said effect comprises shaking the image in a specified way based on random numbers.

16. A system as in claim 10, wherein said effect comprises wobbling in the image according to a sinusoidal operation, and according to specified parameters.

17. A system as in claim 10, wherein said effect comprises forcing the processor to redraw the entire image at specified times.

18. A method, comprising:

specifying at least two different effects for an image to be displayed by an image projector, at least one of the effects including a shape for an outer perimeter of a projected image, and the other of the effects including an image processing effect for the image; and processing said effects to produce a combined image and producing an output signal to be displayed by the image projector; and said specifying comprises specifying said effects in a programming language for a hypothetical processor other than a native programming language of a processor used for said processing, and further comprising, prior to said processing, interpreting said effects from said programming language into said native programming language.

19. A method as in claim 18, wherein said processing combines said effects so that one of the effects changes an image produced by the other of the effects.

20. A method as in claim 18, wherein said image processing affect defines rotating the image around a center of rotation which is outside of the screen that displays the current image.

21. A method as in claim 18, wherein said image processing effect comprises defining a hole and allowing only parts within that hole to be seen.

22. A method as in claim 18, wherein said image processing effect comprises changing a color of a different effect.

23. A method as in claim 18, wherein said image processing affect comprises defining a time, and reducing said effect after said time.

24. A method as in claim 18, wherein said image processing effect comprises shaking an image defined by the other effects based on at least one random number.

25. A method as in claim 18, wherein said image processing effect comprises wobbling in the image according to a sinusoidal operation.

26. A method as in claim 25, further comprising defining parameters of the sinusoidal wobbling.

27. A method as in claim 18, wherein said image processing effect comprises forcing redraw of the entire image at specified times.

28. A method, comprising:

defining an image to be projected by an image projector;

defining an image processing effect for the image according to a segment of compiled code, that is compiled in a first processor language of a first processor; said image processing effect being in a programming language for a hypothetical processor other than a native programming language of a second processor used for processing, prior to said processing, interpreting said effects from said programming language into said native programming language; and using said second processor to form the image processing effect using said native programming language; and producing an output representing the image to be projected.

29. A method as in claim 28, further comprising using the output to control a projector to project a light beam.

30. A method as in claim 28, wherein said image is an image with a defined outer perimeter of a specified shape defined according to a shape definition.

31. A method as in claim 30, wherein said defining comprises defining multiple layers, at least one of said layers defining said outer perimeter, and at least one other layer defining an image processing effect.

* * * * *